United States Patent
Levi et al.

(10) Patent No.: US 12,556,494 B2
(45) Date of Patent: Feb. 17, 2026

(54) MANAGING MULTIPLANE NETWORKS

(71) Applicant: MELLANOX TECHNOLOGIES, LTD., Yokneam (IL)

(72) Inventors: Lion Levi, Yavne (IL); Ortal Bashan, Tel-Aviv (IL); Alex Netes, Rehovot (IL); Lior Hodaya Bezen, Tel-Aviv (IL); Guy Rozenberg Kunievsky, Rehovot (IL); Inbal Gal, Ramat Gan (IL); Vladimir Koushnir, Rishon le Zion (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 336 days.

(21) Appl. No.: 18/114,860

(22) Filed: Feb. 27, 2023

(65) Prior Publication Data

US 2024/0291775 A1   Aug. 29, 2024

(51) Int. Cl.
*H04L 49/113* (2022.01)
*H04L 45/00* (2022.01)

(52) U.S. Cl.
CPC ............ *H04L 49/113* (2022.05); *H04L 45/54* (2013.01)

(58) Field of Classification Search
None
See application file for complete search history.

(56) References Cited

U.S. PATENT DOCUMENTS

| | | | |
|---|---|---|---|
| 4,965,788 A | 10/1990 | Newman | |
| 7,054,263 B1 | 5/2006 | Lindblom et al. | |
| 7,058,027 B1 | 6/2006 | Alessi et al. | |
| 7,257,758 B1 | 8/2007 | Manula et al. | |
| 7,668,981 B1 | 2/2010 | Nagineni et al. | |
| 8,886,783 B2 | 11/2014 | Johnsen et al. | |
| 8,958,420 B1 | 2/2015 | Shekhar et al. | |
| 10,382,396 B2 | 8/2019 | Itkin et al. | |
| 11,750,513 B2 | 9/2023 | Bodanski et al. | |
| 11,895,015 B1 | 2/2024 | Budhia et al. | |
| 11,909,671 B1 | 2/2024 | Chaves et al. | |
| 2003/0120852 A1 | 6/2003 | McConnell et al. | |
| 2004/0001503 A1 | 1/2004 | Manter | |
| 2004/0213220 A1 | 10/2004 | Davis | |
| 2005/0271073 A1 | 12/2005 | Johnsen et al. | |
| 2005/0273641 A1 | 12/2005 | Sandven et al. | |
| 2006/0006905 A1 | 1/2006 | Chou et al. | |
| 2006/0116023 A1 | 6/2006 | Spitaels et al. | |
| 2008/0304428 A1 | 12/2008 | Stilling et al. | |
| 2010/0095064 A1 | 4/2010 | Aviles | |
| 2010/0098089 A1 | 4/2010 | Makino | |
| 2010/0115174 A1 | 5/2010 | Akyol et al. | |
| 2010/0310253 A1 | 12/2010 | Kokje et al. | |

(Continued)

OTHER PUBLICATIONS

U.S. Appl. No. 18/073,662, filed Dec. 2, 2022, Bashan et al.

(Continued)

*Primary Examiner* — Hong S Cho (74) *Attorney, Agent, or Firm* — Sheridan Ross P.C.

(57) ABSTRACT

A system for implementing a multiplane network comprises a network device including a plurality of switches for routing traffic to an endpoint through a network of other switches. Each switch in the plurality of switches corresponds to a different plane of the multiplane network. The system includes one or more circuits that manages the plurality of switches as a single logical entity.

17 Claims, 7 Drawing Sheets

(56) References Cited

U.S. PATENT DOCUMENTS

| | | |
|---|---|---|
| 2011/0228789 A1 | 9/2011 | Jia |
| 2013/0054947 A1 | 2/2013 | Gavrilov |
| 2013/0089089 A1 | 4/2013 | Kamath et al. |
| 2013/0142197 A1* | 6/2013 | Lacroute .............. H04L 49/111 370/386 |
| 2013/0275835 A1 | 10/2013 | Aswadhati |
| 2013/0347092 A1 | 12/2013 | McBrearty et al. |
| 2014/0078904 A1 | 3/2014 | Yu |
| 2014/0112338 A1 | 4/2014 | Huang |
| 2014/0177639 A1 | 6/2014 | Vershkov et al. |
| 2014/0211808 A1 | 7/2014 | Koren et al. |
| 2014/0301401 A1 | 10/2014 | Wang et al. |
| 2015/0172112 A1 | 6/2015 | Itkin et al. |
| 2015/0181317 A1 | 6/2015 | Yin et al. |
| 2015/0338909 A1 | 11/2015 | Woodruff |
| 2017/0180264 A1 | 6/2017 | Izenberg et al. |
| 2017/0264554 A1 | 9/2017 | Contavalli |
| 2017/0302525 A1 | 10/2017 | Chen et al. |
| 2017/0324681 A1* | 11/2017 | Johnsen .................. H04L 49/25 |
| 2018/0183758 A1 | 6/2018 | Itkin et al. |
| 2019/0007346 A1 | 1/2019 | Johnsen et al. |
| 2019/0012278 A1 | 1/2019 | Sindu et al. |
| 2019/0079897 A1 | 3/2019 | Kochevar-Cureton et al. |
| 2019/0190777 A1 | 6/2019 | Uchizumi et al. |
| 2019/0245751 A1 | 8/2019 | Wong |
| 2019/0379594 A1 | 12/2019 | Johnsen et al. |
| 2020/0104275 A1 | 4/2020 | Sen et al. |
| 2020/0136999 A1 | 4/2020 | Abegnoli et al. |
| 2020/0159568 A1 | 5/2020 | Goyal et al. |
| 2020/0371828 A1 | 11/2020 | Chiou et al. |
| 2021/0051115 A1 | 2/2021 | Annamary et al. |
| 2021/0152494 A1 | 5/2021 | Johnsen et al. |
| 2021/0263866 A1 | 8/2021 | Norman et al. |
| 2022/0124036 A1 | 4/2022 | Yan et al. |
| 2022/0245522 A1 | 8/2022 | Ramachandran et al. |
| 2022/0335563 A1 | 10/2022 | Elzur |
| 2022/0385579 A1 | 12/2022 | Rangel et al. |

OTHER PUBLICATIONS

U.S. Appl. No. 18/120,822, filed Mar. 13, 2023, Menes et al.
U.S. Appl. No. 18/132,519, filed Apr. 10, 2023, Eran et al.
U.S. Appl. No. 18/200,443, filed May 22, 2023, Eran et al.

* cited by examiner

| ID type | Multiplane HCA 400 | Multiplane Network Device 302 |
|---|---|---|
| LID | Same for a multiplane port and associated plane ports | Per switch IC |
| GID | Same for a multiplane port and associated plane ports | Per switch IC |
| IP address | Same for a multiplane port and associated plane ports | Per switch IC |
| System GUID | Same for a multiplane port and associated plane ports | Per device |
| Node GUID | Same for a multiplane port and associated plane ports | Per switch IC |
| Port GUID | Per multiplane port and plane port | Per switch IC |

MANAGING MULTIPLANE NETWORKS

FIELD OF THE DISCLOSURE

The present disclosure is generally directed to systems, methods, and devices for managing multiplane networks.

BACKGROUND

Network switches are used in networking systems, like datacenters, for routing data between endpoints. High performance computing (HPC) networks demand switches with higher bandwidth and radix while maintaining low latencies.

BRIEF SUMMARY

In an illustrative embodiment, a network device for implementing a multiplane network comprises a plurality of switches for routing traffic to an endpoint through a network of other switches. Each switch in the plurality of switches corresponds to a different plane of the multiplane network. The network device may include one or more circuits that manages the plurality of switches as a single logical entity. In at least one embodiment, the one or more circuits uses a same local identifier (LID) for a multiplane port and associated plane ports of the endpoint. In at least one embodiment, the one or more circuits uses a same global identifier (GID) for a multiplane port and associated plane ports of the endpoint. In at least one embodiment, the one or more circuits uses a same IP address for a multiplane port and associated plane ports of the endpoint. In at least one embodiment, the one or more circuits uses a same node global unique identifier (GUID) for a multiplane port and associated plane ports of the endpoint. In at least one embodiment, the one or more circuits uses a different port GUID for each multiplane port and each plane port of the endpoint. In at least one embodiment, the plurality of switches route traffic according to InfiniBand® protocol or IP protocol. In at least one embodiment, the one or more circuits enforces symmetry across the different planes of the multiplane network. In at least one embodiment, the one or more circuits enforces symmetry by reflecting a failure of one plane of the multiplane network to remaining planes of the multiplane network. In at least one embodiment, the one or more circuits applies the same transmission parameters to the different planes. In at least one embodiment, the transmission parameters comprise one or more of maximum transmission unit (MTU), transmission bandwidth, number of virtual lanes, and transmission speed. In at least one embodiment, the one or more circuits identifies multiplane components within the multiplane network. In at least one embodiment, the one or more circuits applies a same routing table to the different planes of the multiplane network.

In another illustrative embodiment, a system for implementing a multiplane network comprises a network device comprising a plurality of switches for routing traffic to an endpoint. Each switch in the plurality of switches corresponds to a different plane of the multiplane network. The system may further include a controller that manages the plurality of switches as a single logical entity, and a network of other switches coupled to the plurality of switches to route the traffic to the endpoint. In at least one embodiment, the network of other switches comprises a prism switch. In at least one embodiment, the controller enforces symmetry by activating and inactivating the different planes of the multiplane network over time. In at least one embodiment, the controller activates and inactivates the different planes to ensure that the endpoint and another endpoint are connected to each other by the network of other switches on all the different planes or on none of the different planes. In at least one embodiment, the system further comprises the endpoint and the another endpoint. In some examples, the endpoint and the another endpoint each comprise a host channel adapter (HCA). In at least one embodiment, the plurality of switches comprises four switches housed in a same housing, and the network of other switches comprises a group of two switches connected to the four switches of the plurality of switches or a group of four switches connected to the four switches of the plurality of switches.

In another illustrative embodiment, a system for implementing a multiplane network comprises a plurality of switches for routing traffic to an endpoint through a network of other switches. Each switch in the plurality of switches corresponds to a different plane of the multiplane network. The endpoint comprises multiple ports connected to the network of other switches. The system further comprises one or more circuits that use a same address for the multiple ports of the endpoint to route the traffic to the endpoint through the plurality of switches and the network of other switches.

It should be appreciated that inventive concepts cover any embodiment in combination with any one or more other embodiments, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Throughout the instant description, a switch integrated circuit (IC) should generally be understood to comprise switching hardware, such as an application specific integrated circuit (ASIC) that has switching capabilities. Multiplane network devices and non-multiplane network devices used in multiplane networks described herein may each include a single switch IC or multiple switch ICs.

Inventive concepts relate to network devices for a multiplane network (also called a planarized network or planarization or the like). A multiplane network may be implemented by dividing the switching fabric of a traditional communication network into multiple planes. For example, a related art, non-multiplane network device for HPC systems may include a single high-bandwidth switch IC that is managed on a per-switch IC basis along with other high-bandwidth switches in the same network device or in other network devices of the switching fabric.

A multiplane network device according to inventive concepts, however, is a network device having multiple smaller-bandwidth switch ICs that, when taken collectively, have an aggregated bandwidth equal to the single high-bandwidth switch IC of the related art. According to inventive concepts, multiplane network devices of a switching fabric are managed by a centralized controller, such as a software-defined network (SDN) controller. Controllers of related art non-multiplane network devices manage each physical interface (e.g., each port of switch IC) of the network device as an individual entity. Meanwhile, an SDN controller according to inventive concepts manages the multiple smaller bandwidth switch ICs of a multiplane network device as a single logical entity. In addition, the multiple smaller bandwidth switch ICs of a multiplane network device may not be visible to the user (e.g., the multiple switch ICs are not exposed to an application programming interface (API) that enables user interaction with the network so that applications can use the network without being aware of the planes). Stated another way, the system is constructed such that applications perceive the multiple smaller bandwidth switch ICs of a multiplane network device as a single, larger bandwidth switch IC. Challenges associated with multiplane networks include how the SDN controller configures and monitors the fabric to assign addresses, receive telemetry data, calculate routing algorithms, and the like, all while maintaining low latencies.

In addition to the above challenges at each multiplane network device routing traffic, other challenges arise at the host end. In one non-limiting implementation involving host channel adapters (HCAs), planarization introduces challenges associated with configuring and controlling multiple HCA physical ports to behave as a single network entity. In a multiplane network, a multiplane HCA may include a logically created multiplane port associated with multiple physical plane ports aggregated toward the network. The physical plane ports of an HCA may be connected to intervening switches between the HCA and the multiplane network device(s), such as a single switch (e.g., a prism switch) of another network device or multiple switch ICs. Each plane port of an HCA may be configured with the same attributes (e.g., a same local identifier (LID), a same global identifier (GID)) by firmware of the HCA.

An SDN controller according to inventive concepts may configure switches of the fabric and HCAs to achieve consistent or similar performance across the multiple planes. The SDN controller may accomplish this by enforcing the same policies across multiple components, which appears to the user as a single interface. For example, a multiplane network may have same or similar routing decisions made across the planes and/or enforce symmetry across the planes to account for failed or non-existent connections.

In general, multiplane networks comprise multiplane network devices (e.g., network switches each with multiple smaller bandwidth switch ICs) and, in some cases, other multiplane devices (e.g., HCAs or other host devices) that enable management of multiple physical ports as a single logical entity. For example, a multiplane network may use a same address (e.g., IP address) for multiple physical ports of an HCA. In another example, a multiplane network may enforce the same or similar transmission parameters (e.g., maximum transmission unit (MTU) size, speed, bandwidth, number of virtual lanes) across the planes of the network. A multiplane network may additionally use the same or similar routing tables for the planes of the network, enforce symmetry across the planes of the network in the event of a failure, and facilitate alignment between a tenant user and a network administrator. These features and other functions of a multiplane network are described in more detail below.

Figure 1:
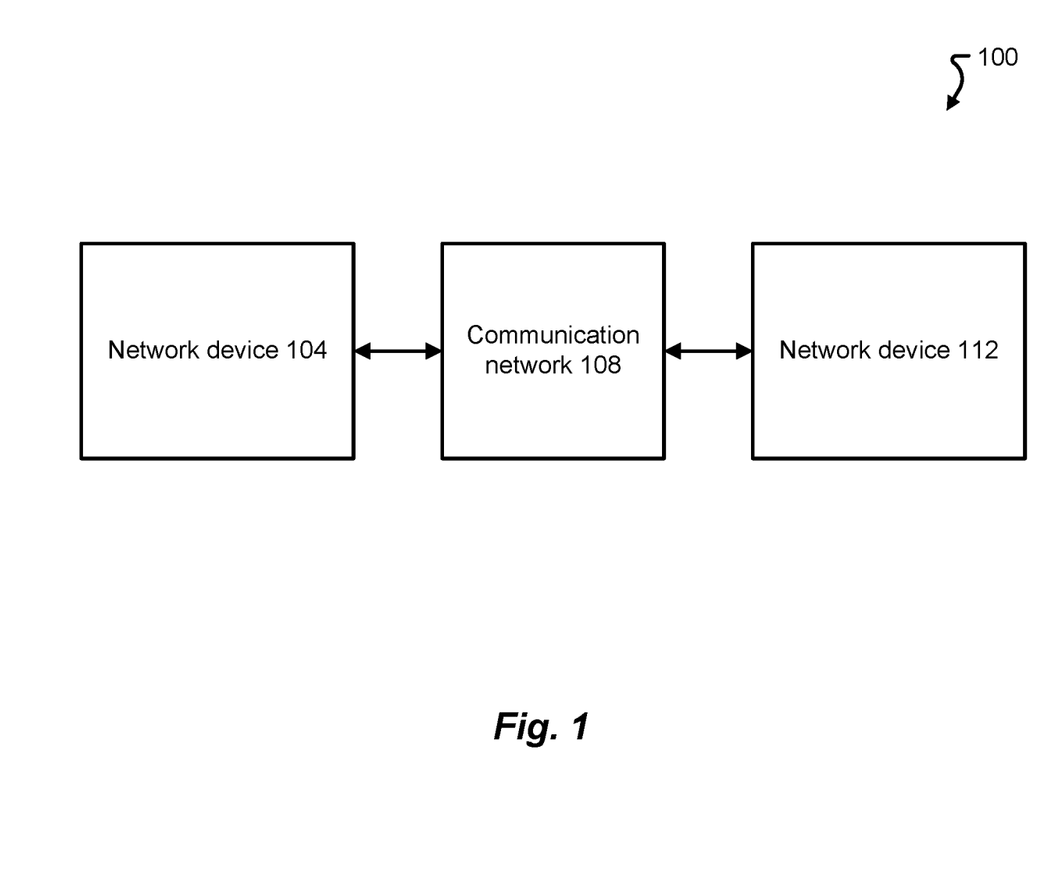
FIG. 1 illustrates a block diagram of a networking system according to at least one example embodiment.

FIG. 1 illustrates a system 100 according to at least one example embodiment. The system 100 includes a network device 104, a communication network 108, and a network device 112. In at least one example embodiment, network devices 104 and 112 may correspond a network switch (e.g., an Ethernet switch), a collection of network switches, a network interface controller (NIC), an HCA, or any other suitable device used to process and traffic data between devices connected to communication network 108. Each network device 104 and 112 may be connected to one or more of a Personal Computer (PC), a laptop, a tablet, a smartphone, a server, a collection of servers, or the like. In one specific, but non-limiting example, a network device 104 and/or 112 includes a multiplane network switch with multiple smaller bandwidth switch ICs that are managed by a controller (e.g., an SDN controller) as a single logical entity.

Examples of the communication network 108 that may be used to connect the network devices 104 and 112 include an Internet Protocol (IP) network, an Ethernet network, an InfiniBand® (IB) network, a Fiber Channel network, the Internet, a cellular communication network, a wireless communication network, combinations thereof (e.g., Fibre Channel over Ethernet), variants thereof, and/or the like. In one specific, but non-limiting example, the communication network 108 comprises a switching fabric for routing traffic in a network that comprises multiplane network devices, non-multiplane network devices, and endpoints (e.g., HCAs) using InfiniBand® and/or Ethernet technology.

The network device 104 and/or the network device 112 may include storage devices and/or one or more circuits for carrying out computing tasks, for example, tasks associated with controlling the flow of data within each network device 104 and 112 and/or over the communication network 108. The one or more circuits may comprise software, hardware, or a combination thereof. For example, the one or more circuits may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the one or more circuits may comprise one or more hardware circuits, such as an application specific integrated circuit (ASIC). Other non-limiting examples of one or more circuits include an Integrated Circuit (IC) chip, a Central Processing Unit (CPU), a Graphics Processing Unit (GPU), a microprocessor, a Field Programmable Gate Array (FPGA), a collection of logic gates or transistors, resistors, capacitors, inductors, diodes, or the like. Some or all of the one or more circuits may be provided on a Printed Circuit Board (PCB) or collection of PCBs. It should be appreciated that any appropriate type of electrical component or collection of electrical components may be suitable for inclusion in the one or more circuits.

In addition, although not explicitly shown, it should be appreciated that the network devices 104 and 112 include one or more communication interfaces for facilitating wired and/or wireless communication between one another and other unillustrated elements of the system 100.

Figure 2:
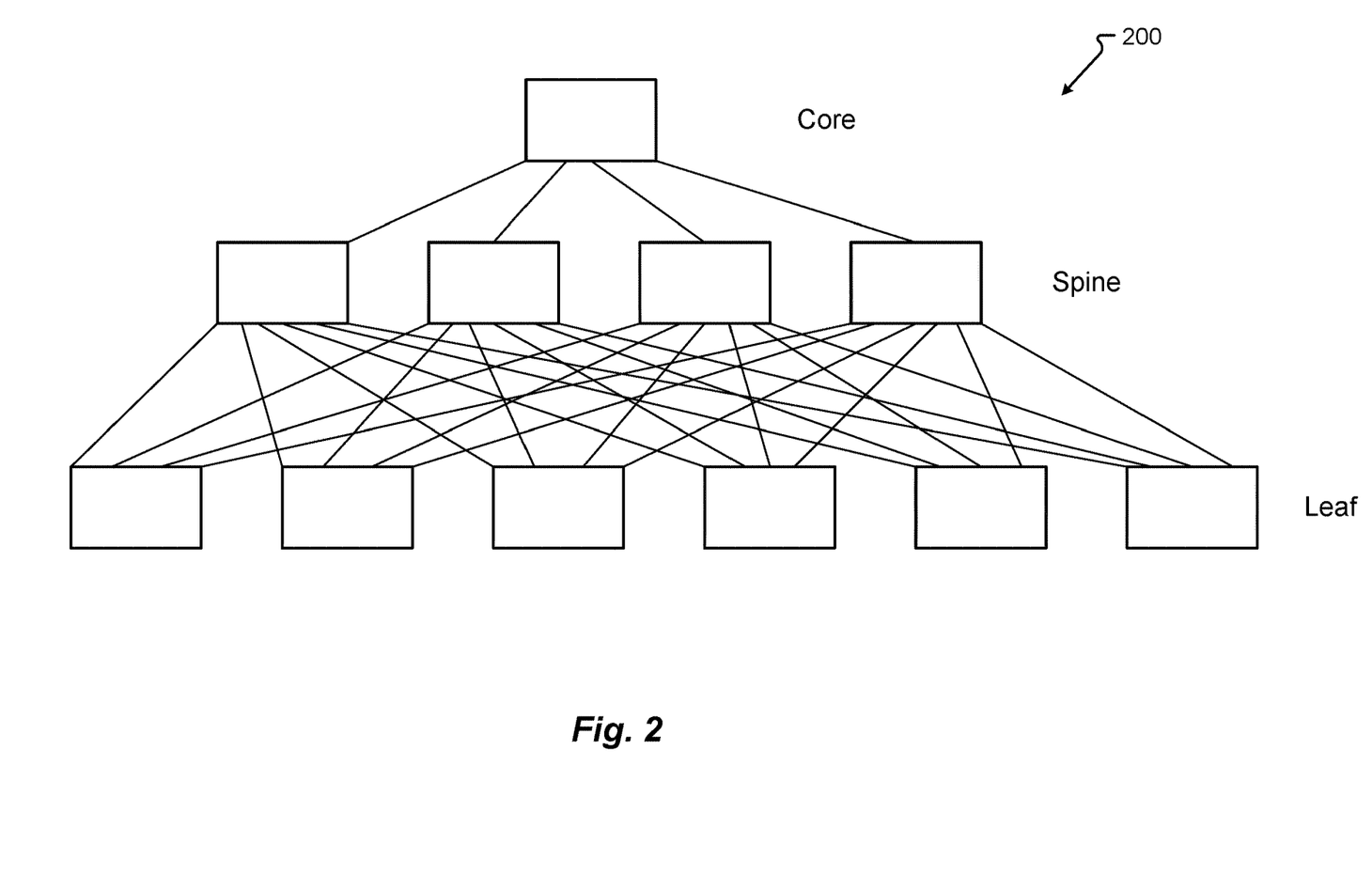
FIG. 2 illustrates a networking topology according to at least one example embodiment.

FIG. 2 illustrates a networking topology 200 according to at least one example embodiment. The topology 200 is a three tier topology with core, spine (or aggregation), and leaf (or access) layers. Each box of each layer represents a collection of network switches that is repeated for that layer. Although not explicitly shown, endpoints that comprise HCAs, servers and/or user terminals may be connected to the leaf layer. Here, it should be appreciated that example embodiments are not limited to the topology 200, and inventive concepts may be applied to other suitable network topologies (e.g., a two tier topology with spine and leaf layers). As discussed in more detail below, example embodiments relate to multiplane network switches and other multiplane network components which may be configured according to the topology 200.

Figure 3A:
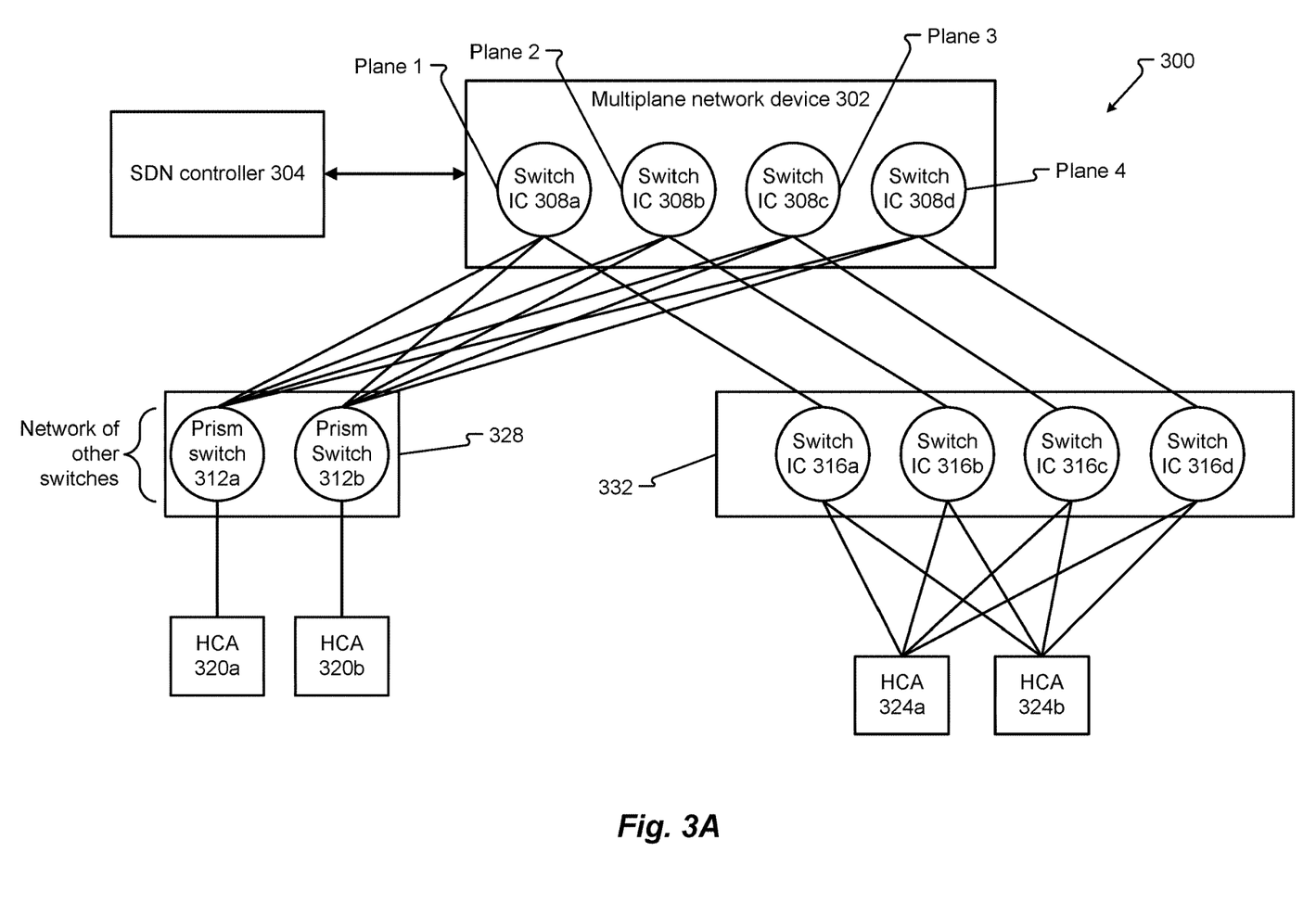
FIGS. 3A to 3C illustrate examples of a multiplane network according to at least one example embodiment.

FIG. 3A illustrates a multiplane network 300 according to at least one example embodiment. The multiplane network 300 may be included as part of the communication network 108 in FIG. 1. As shown in the example of FIG. 3A, the multiplane network 300 includes a multiplane network device 302 with a plurality of switches 308, an SDN controller 304, a network of other switches including prism switches 312a, 312b, and switch ICs 316a to 316d, and endpoints including host devices that are embodied in this example by HCAs 320a, 320b, and 324a to 324c. It should be appreciated that more or fewer of the elements illustrated in FIG. 3A may be included in the multiplane network 300. Throughout the instant description it should be appreciated that reference may be made to the root reference numeral of an element when reference to a specific element is not necessary (e.g., switch ICs 316a to 316d may be referred to as switch ICs 316).

The multiplane network device 302 may be a non-limiting embodiment of a network device 104 and 112 in FIG. 1. In accordance with example embodiments, the multiplane network device 302 includes a plurality of switches as switch ICs 308 each having a smaller bandwidth compared to related art devices with a single large bandwidth switch IC. For example, the multiplane network device 302 may have an aggregate bandwidth of 800 Gb/s formed by each switch IC 308 having a bandwidth of 200 Gb/s. In general, a multiplane network device 302 routes traffic between endpoints, such as an HCA 320 and 324, through the network of other switches 312 and/or 324. As may be appreciated, each switch IC 308 corresponds to a different plane of the multiplane network 300. In FIG. 3A, the multiplane network 300 comprises four planes, one plane per switch IC 308a to 308d. Although FIG. 3A illustrates four switch ICs 308 (and four planes), it should be appreciated that a number of switch ICs 308 and the number of planes may be more or fewer (e.g., two switch ICs 308 and two planes). In any event, it should be appreciated that the switch ICs 308c are housed in a same housing, such as a housing of a network switch that mounts within a rack (e.g., a 32 U rack).

As described herein, the SDN controller 304 may run one or more applications for controlling traffic in the multiplane network 300. The SDN controller 304 may be a standalone element in the network 300, part of the network device 302, part of some other network element in the network 300, or any combination thereof. The SDN controller 304 may comprise one or more circuits for running the application(s) to manage the multiplane network 300. The one or more circuits of the SDN controller 304 should be understood to encompass the same or similar hardware and/or software as described above with reference network devices 104 and 112 in FIG. 1. For example, the SDN controller 304 manages the switch ICs 308 of the multiplane network device 302 as a single logical entity when routing traffic through the network. Managing the switch ICs 308 as a single logical entity may be defined by the SDN controller 304 having the switch ICs 308 appear within the network 300 as a single large bandwidth switch IC instead of multiple smaller bandwidth switch ICs (e.g., the network device 302 appears to a user or tenant as a single 800 Gb/s switch IC instead of four 200 Gb/s switch ICs 308). Stated another way, the underlying planes of the multiplane network 300 are visible to the SDN controller 304 but not to a user. Accordingly, it may be said that the SDN controller 304 is plane-aware while other components of the system are not plane-aware.

As shown in FIG. 3A, each plane (i.e., each switch IC 308) of the multiplane network device 302 is connected to an endpoint HCA through a network of other switches, which may comprise prism switches 312 and/or switch ICs 316. A prism switch 312 may be capable of connecting a respective HCA 320 to each plane 1, 2, 3, and 4 through a respective switch IC 308a, b, c, and d. As such, a prism switch 312 may include mechanisms that enable switching between planes through a selection mechanism. For example, a prism switch 312 may comprise micro-electromechanical systems (MEMS) (e.g., micromirrors) that selectively connect an HCA 320 to a particular plane 1, 2, 3, 4. FIG. 3A illustrates an example where two prism switches 312a and 312b are included in a housing of a single network device 328, however, example embodiments are not limited thereto and more or fewer prism switches 312 may be included.

Like prism switches 312, switch ICs 316 may be housed in a single housing of a network device 332, and each switch IC 316 may comprise switching hardware (e.g., an ASIC) and be connected to a respective switch IC 308 through a respective plane. Furthermore, each switch 316 may be connected to an HCA 324.

As noted above, it may be said that the SDN controller 304 is plane-aware, which means that the SDN controller 304 is able to identify components specifically designed for the multiplane network 300. For example, the SDN controller 304 is able to distinguish multiplane HCAs from legacy HCAs and correlate between the different planes to reach a specific HCA which at least in part aided by the SDN controller 304 assigning a same NodeGUID to multiple plane ports of an HCA. The SDN controller 304 may also be able to construct a topology graph that correlates each HCA port in one plane to an equivalent port in each of the other planes. Still further, the plane-aware SDN controller 304 is capable of identifying plane cross locations where traffic is able to switch planes within a single device due to cross plane cabling and/or plane cross switches. In other words, the SDN controller 304 knows whether a network device 328 or 332 has the capability to internally route traffic on one plane to another plane (e.g., traffic received by switch IC 316a can be routed to switch IC 316b within the network device 332).

The multiplane network 300 may be operable in a symmetric mode and an asymmetric mode. The planes of the network 300 may be said to have symmetry in that i) every two nodes (e.g., nodes HCA 324a and 324b) are connected to each other through all planes or through no planes and ii) plane topology is the same for all planes. When operating in the symmetric mode, the SDN controller 304 enforces this symmetry over the life of the cluster by reflecting a link failure of one plane to the remaining planes, which maintains symmetry. Stated another way, the failure of a plane between two nodes is reflected to other nodes by not using or inactivating corresponding planes connecting the other nodes so that conditions i) and ii) above remain true. The symmetric mode reduces the complexity of balancing traffic between planes because all planes are assumed to be similar. The above described symmetry may be enforced by the SDN controller's 304 awareness of the planes and/or by other components, such as multiplane HCAs and/or multiplane switches that align the planes over time. Notably, symmetry in this context does not necessarily mean that all nodes (HCAs) have a same number of lanes since topology construction enables each node to be accessible from all available planes.

The above-described symmetrical mode of operation may require adjustments between planes to maintain or enforce symmetry over time. For example, the network 300 may align multiplane logical link states such that if a link between switches or between a switch and an HCA fails or is initiated, the other links are brought into alignment (e.g., activated or deactivated). The network 300 may maintain symmetry by aligning multiplane switches of the system such that if a switch IC fails or becomes active in a network device, the other switch ICs in that device are deactivated (in the event of a failure) or activated. The network 300 may also align multiplane HCAs so that if one plane of an HCA becomes active or inactive, other planes are activated or inactivated accordingly.

Figure 3B:
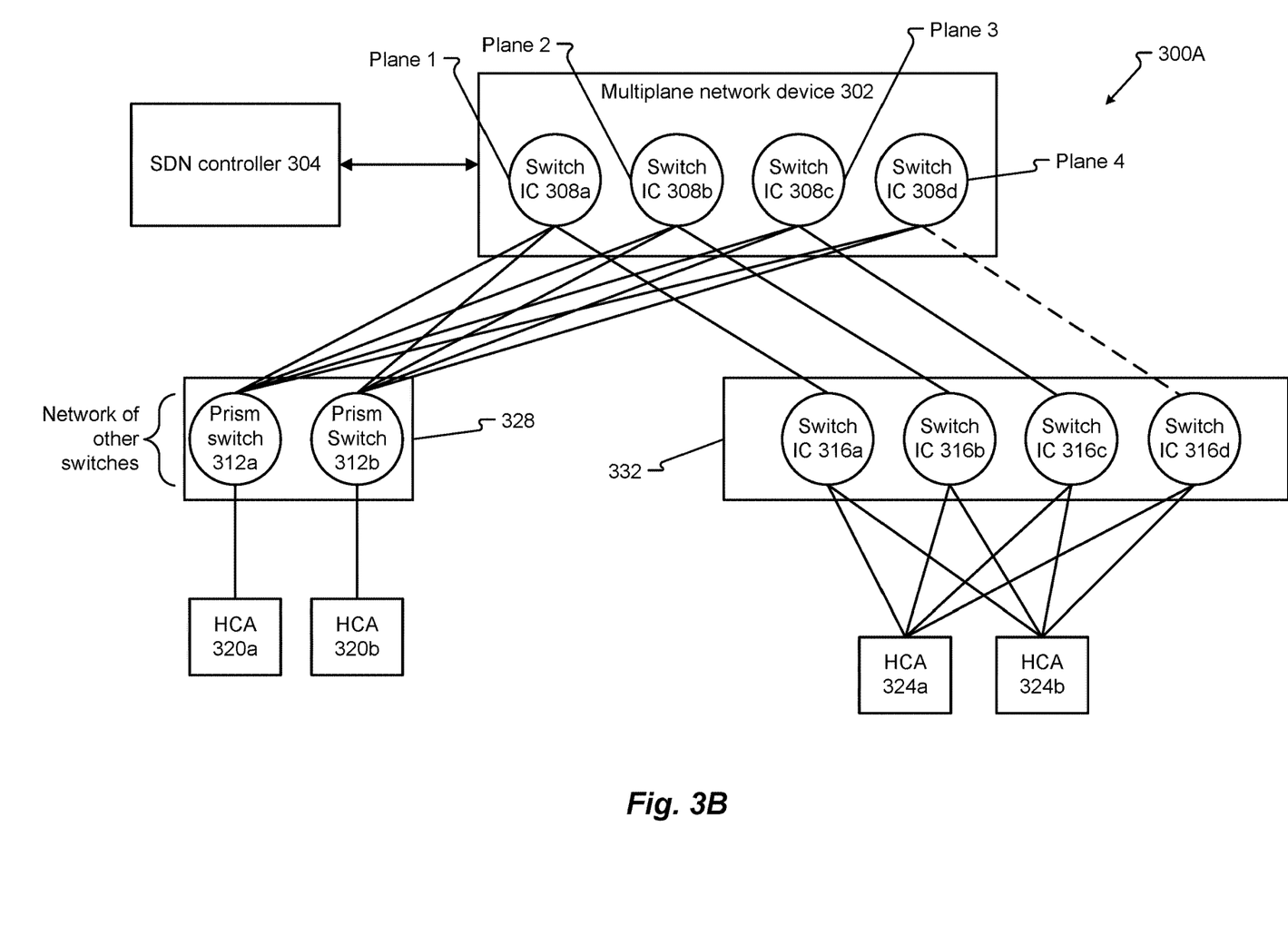
Figure 3C:
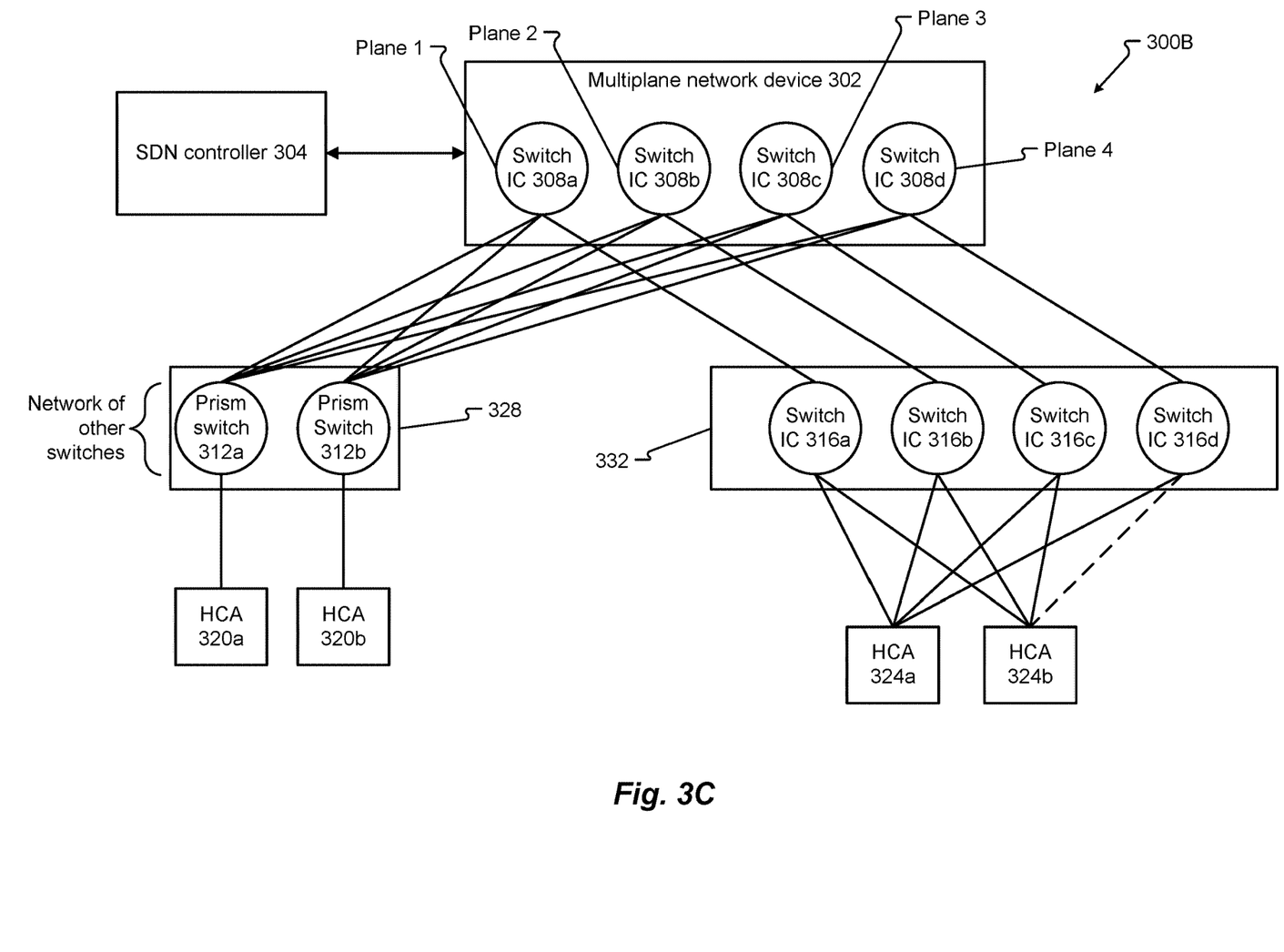

In some examples, the multiplane network 300 may be operated in an asymmetric mode where i) the plane topology is different upon initiation or changes over time, and/or ii) different planes provide different performance based on routing and structure. FIGS. 3B and 3C illustrate examples of asymmetric networks 300A and 300B, respectively. FIG. 3B illustrates an example of asymmetric switch connectivity in that plane number 4 has a failed or missing connection between switch IC 308d and switch IC 316d (illustrated with a dashed line). Meanwhile, FIG. 3C illustrates an example of asymmetric HCA connectivity in that HCA 324b is not connected to switch IC 316d (illustrated with a dashed line). The SDN controller 304 is aware of the asymmetry in the networks 300A and 300B and the asymmetry may affect forwarding decisions and load balancing between planes.

Figure 4:
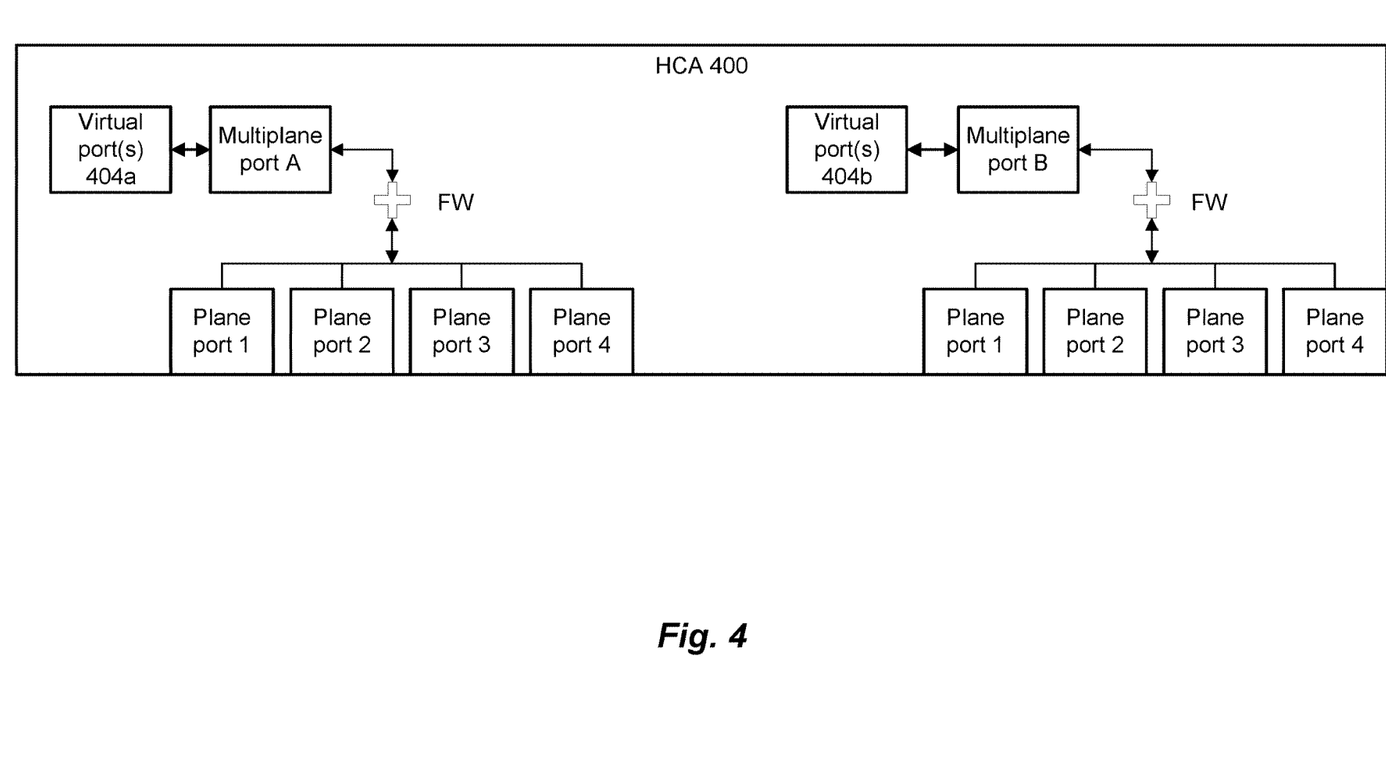
FIG. 4 illustrates an example structure of a multiplane HCA according to at least one example embodiment.

FIG. 4 illustrates an example structure of a multiplane HCA 400 according to at least one example embodiment. The HCAs described herein (e.g., in FIGS. 3A to 3C) may include multiplane HCAs 400. The multiplane HCA 400 may comprise one or more multiplane ports and one or more plane ports. Every multiplane port of a multiplane HCA 400 may be connected to N plane ports (where N is also the number of planes in a multiplanar network). In the example of FIG. 4, the multiplane ports A and B are each connected to or associated with respective plane ports 1 to 4. Here, it should be appreciated that the multiplane ports A and B are not physical ports, but are instead logically created by firmware FW of the HCA 400 for the respective planes. Each multiplane port A and B may be connected to one or more respective virtual ports 404a and 404b which each virtual port being assigned a function, such as a virtual remote direct memory access (RDMA) function.

Meanwhile, each plane port 1 to 4 may be associated with one of the planes 1 to 4 of the multiplane network 300. Each plane port corresponds to a single physical port of the HCA 400 that connects to a corresponding plane of the network 300. A multiplane HCA 400 may be identified with a node info attribute (e.g., a bit is added to a datagram, such as a Management Datagram (MAD) to specify the HCA as a multiplane HCA 400). Both the multiplane ports and the plane ports are represented as ports on the MAD layer, meaning each type of port answers to port info MAD and other port related MADs. Some of the MAD fields are configured per multiplane port only and affect the associated plane ports (such as QoS related fields)—those fields should be configured through the multiplane port. Meanwhile, other fields (such as error counters) remain relevant to the plane ports, and those fields are written individually to each plane port.

As may be appreciated, plane ports 1 to 4 associated with multiplane port A can access each other's MAD fields, but cannot access MAD fields of plane ports 1 to 4 associated with multiplane port B (and vice versa). Stated another way, data handled by plane ports 1 to 4 of multiplane port A cannot traverse to plane ports 1 to 4 of multiplane port B. As described in more detail herein, each multiplane port and plane ports associated with the multiplane port are assigned a single LID. Meanwhile, each plane port and each multiplane port of an HCA 400 is assigned a separate port GUID. The plane ports and multiple plane ports of an HCA 400 are assigned a single node GUID (because the GUID is used as a unique identifier in legacy HCAs).

Network discovery for a multiplane network 300 is the same as or similar to a non-planarized network. For example, the SDN controller 304 uses direct route functionality to obtain the full topology. The SDN controller 304 may further identify multiplane components (e.g., switches and HCAs). In one example, the SDN controller 304 receives the topology, GUIDs, and plane annotations to assist with discovering the network 300.

Figure 5:
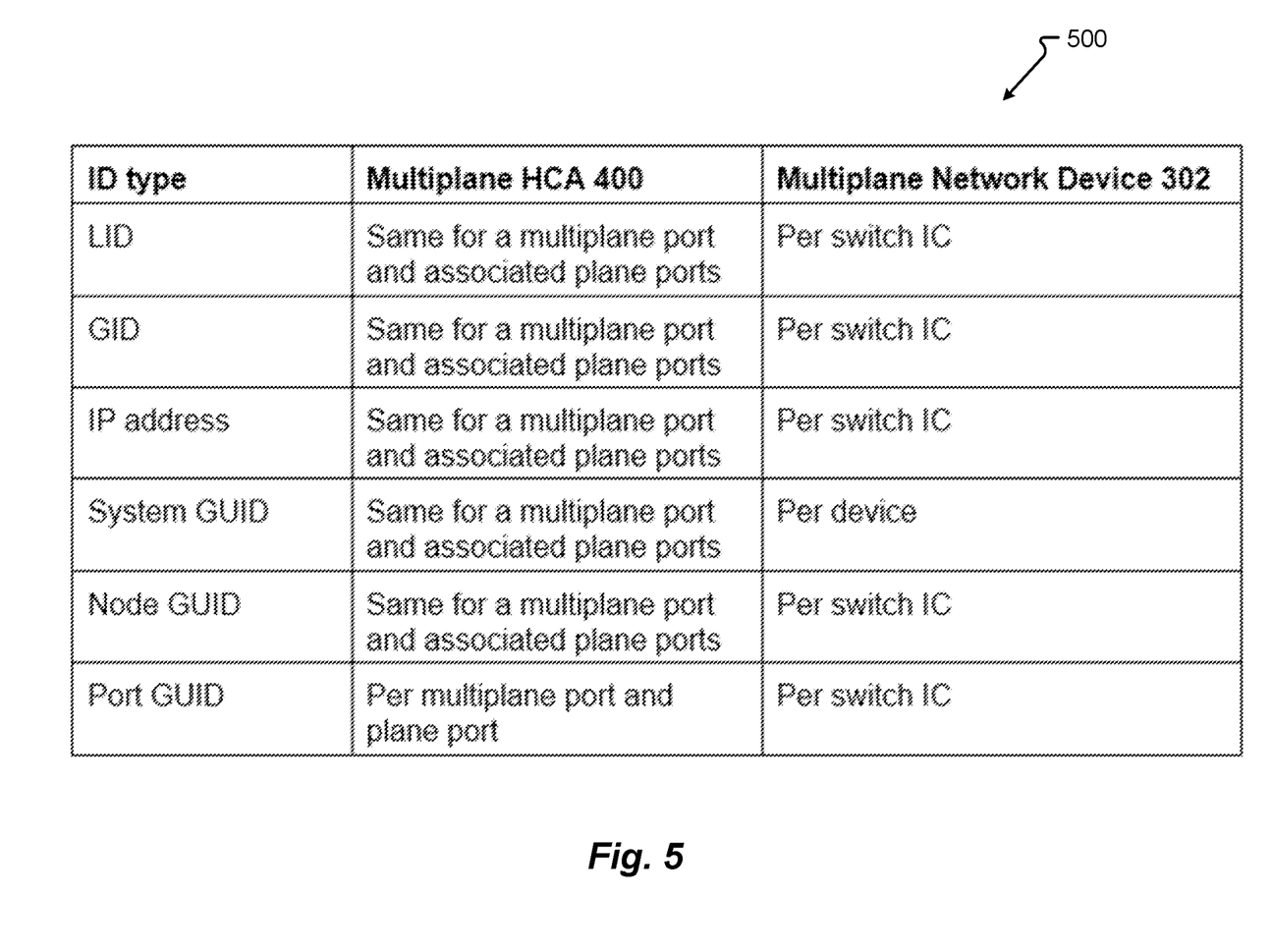
FIG. 5 illustrates a table showing how various identification (ID) types are assigned within a multiplane network according to at least one example embodiment.

FIG. 5 illustrates a table 500 showing how various identification (ID) types are assigned within a multiplane network according to at least one example embodiment. The various ID types shown in FIG. 5 and discussed below may be associated with a particular type of network, such as an InfiniBand® network or an IP network. The various ID types may be assigned by the SDN controller 304, by firmware of an HCA, or other suitable source.

As shown, each multiplane port of an HCA 400 and plane ports associated to that multiplane port may be assigned a same LID, a same GID, a same IP address, a same system global unique identifier (GUID), and a same node GUID. Meanwhile, each multiplane port and each plane port of an HCA 400 may be assigned a different port GUID. As also shown in FIG. 5, each switch IC 308 of a multiplane network device 302 may be assigned a different LID, a different GID, a different IP address, a different node GUID, and a different port GUID. On the other hand, each network device 302 is assigned its own system GUID. The SDN controller 304 uses the various ID types in table 500 as part of managing the switch ICs 308 as a logical entity to route traffic within the network 300.

In view of the above discussion and associated figures, it should be appreciated that example embodiments provide a network device 302 for implementing a multiplane network 300. The network device 302 may include a plurality of switches 308 for routing traffic to an endpoint, such as an HCA 320a, through a network of other switches 312 and/or 316. Each switch 308 in the plurality of switches corresponds to a different plane of the multiplane network 300. The network device 320 may include or be in communication with an SDN controller 304 having one or more circuits that manages or controls the plurality of switches 308 as a single logical entity. For example, as described herein, the one or more circuits uses a same local identifier (LID) for a multiplane port and associated plane ports of the endpoint. In some examples, the one or more circuits uses a same global identifier (GID) for a multiplane port and associated plane ports of the endpoint. In some examples, the one or more circuits uses a same IP address for a multiplane port and associated plane ports of the endpoint. In other examples, the one or more circuits uses a same node global unique identifier (GUID) for a multiplane port and associated plane ports of the endpoint. Still further, the one or more circuits uses a different port GUID for each multiplane port and each plane port of the endpoint. In at least one embodiment, the plurality of switches 308 route traffic according to InfiniBand® protocol or IP protocol. The one or more circuits enforces symmetry across the different planes of the multiplane network 300, which may be accomplished by reflecting a failure of one plane of the multiplane network 300 to remaining planes of the multiplane network 300. In some cases, the one or more circuits applies the same transmission parameters to the different planes of the multiplane network 300. Example transmission parameters comprise a maximum transmission unit (MTU), transmission bandwidth, number of virtual lanes, transmission speed, or any combination thereof. As noted herein, the one or more circuits identifies multiplane components within the multiplane network 300 using established discovery methods. In some cases, the one or more circuits applies a same or similar routing table to the different planes of the multiplane network 300.

In view of the above discussion and associated figures, it should be appreciated that example embodiments provide a system for implementing a multiplane network 300. The system may include a network device 302 comprising a plurality of switches 308 for routing traffic to an endpoint (e.g., HCA 320a), where each switch in the plurality of switches corresponding to a different plane of the multiplane network 300. The system may further include a controller 304 that manages the plurality of switches 308 as a single logical entity a network of other switches 312/316 coupled to the plurality of switches 308 to route the traffic to the endpoint. In some examples, the controller 304 enforces symmetry by activating and inactivating the different planes of the multiplane network over time. For example, the controller 304 activates and inactivates the different planes to ensure that the endpoint (e.g., 320a) and another endpoint (e.g., 320b) are connected to each other by the network of switches on all the different planes or on none of the different planes.

As shown in FIG. 3A, for example, the plurality of switches comprises four switches 308a to 308d housed in a same housing, and wherein the network of other switches comprises a group of two switches 312a and 312b connected to the four switches of the plurality of switches or a group of four switches 316a to 316d connected to the four switches of the plurality of switches.

Although example embodiments have been shown and described with respect to systems having specific types of elements and numbers of elements, it should be appreciated inventive concepts are not limited thereto and that fewer or more elements and/or different types of elements are within the scope of inventive concepts.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiments, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

What is claimed is:

1. A network device for implementing a multiplane network, comprising:
a plurality of switches for routing traffic to an endpoint through a network of other switches, each switch in the plurality of switches corresponding to a different plane of the multiplane network; and
one or more circuits to manage the plurality of switches as a single logical entity, wherein the one or more circuits are to enforce symmetry across the different planes of the multiplane network by reflecting a failure of one plane of the multiplane network to remaining planes of the multiplane network.

2. The network device of claim 1, wherein the one or more circuits are to use a same local identifier (LID) for a multiplane port and associated plane ports of the endpoint.

3. The network device of claim 1, wherein the one or more circuits are to use a same global identifier (GID) for a multiplane port and associated plane ports of the endpoint.

4. The network device of claim 1, wherein the one or more circuits are to use a same IP address for a multiplane port and associated plane ports of the endpoint.

5. The network device of claim 1, wherein the one or more circuits are to use a same node global unique identifier (GUID) for a multiplane port and associated plane ports of the endpoint.

6. The network device of claim 1, wherein the one or more circuits are to use a different port GUID for each multiplane port and each plane port of the endpoint.

7. The network device of claim 1, wherein the plurality of switches are to route traffic according to InfiniBand® protocol or IP protocol.

8. The network device of claim 1, wherein the one or more circuits are to apply the same transmission parameters to the different planes.

9. The network device of claim 8, wherein the transmission parameters comprise at least one of maximum transmission unit (MTU), transmission bandwidth, number of virtual lanes, or transmission speed.

10. The network device of claim 1, wherein the one or more circuits are to identify multiplane components within the multiplane network.

11. The network device of claim 1, wherein the one or more circuits are to apply a same routing table to the different planes of the multiplane network.

12. A system for implementing a multiplane network, comprising:
a network device comprising a plurality of switches for routing traffic to an endpoint, each switch in the plurality of switches corresponding to a different plane of the multiplane network;
a controller to manage the plurality of switches as a single logical entity; and
a network of other switches coupled to the plurality of switches to route the traffic to the endpoint, wherein the plurality of switches comprises four switches housed in a same housing, and wherein the network of other switches comprises a group of two switches connected to the four switches of the plurality of switches or a group of four switches connected to the four switches of the plurality of switches.

13. The system of claim 12, wherein the network of other switches comprises a prism switch.

14. The system of claim 12, wherein the controller is to enforce symmetry by activating and inactivating the different planes of the multiplane network over time.

15. The system of claim 14, wherein the controller is to activate and inactivate the different planes to ensure that the endpoint and another endpoint are connected to each other by the network of other switches on all the different planes or on none of the different planes.

16. The system of claim 15, further comprising:
the endpoint and the another endpoint, wherein the endpoint and the another endpoint each comprise a host channel adapter (HCA).

17. A system for implementing a multiplane network, comprising:
a plurality of switches for routing traffic to an endpoint through a network of other switches, each switch in the plurality of switches corresponding to a different plane of the multiplane network, wherein the endpoint comprises multiple ports connected to the network of other switches; and
one or more circuits to use a same address for the multiple ports of the endpoint to route the traffic to the endpoint through the plurality of switches and the network of other switches, wherein the one or more circuits are to enforce symmetry across the different planes of the multiplane network by reflecting a failure of one plane of the multiplane network to remaining planes of the multiplane network.

\* \* \* \* \*